No. 828,269.
PATENTED AUG. 7, 1906.
C. R. BOHANNON.
VEHICLE WHEEL.
APPLICATION FILED APR. 21, 1905.
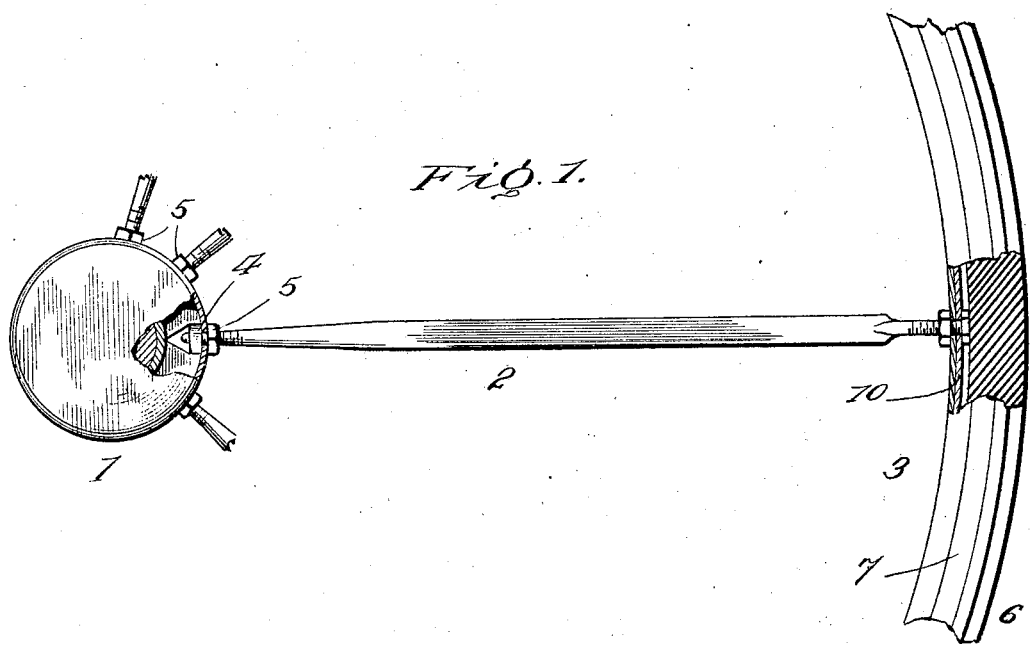
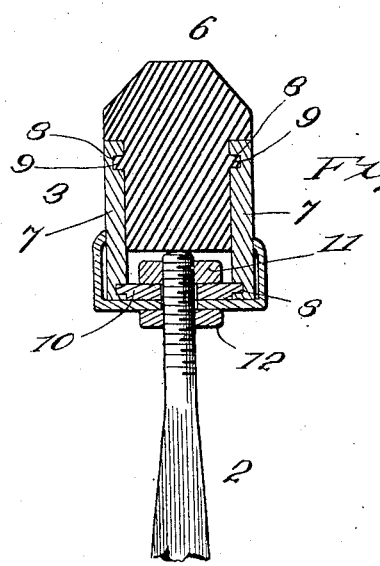
Inventor
C. R. Bohannon
Witnesses
By Racey, Attorneys

UNITED STATES PATENT OFFICE.

CHARLEY R. BOHANNON, OF WELSH, LOUISIANA.

VEHICLE-WHEEL.

No. 828,269.     Specification of Letters Patent.     Patented Aug. 7, 1906.

Original application filed August 31, 1904, Serial No. 222,859. Divided and this application filed April 21, 1905. Serial No. 256,734.

*To all whom it may concern:*

Be it known that I, CHARLEY R. BOHANNON, a citizen of the United States, residing at Welsh, in the parish of Calcasieu and State of Louisiana, have invented certain new and useful Improvements in Vehicle-Wheels, of which the following is a specification.

This invention relates to vehicle-wheel construction; and it consists, essentially, of novel means for attaching spokes to the rim of the wheel.

The invention includes also special operative parts whereby the tire may be secured to the rim by spokes which connect the hub and rim, this feature of the invention being of importance within the contemplation thereof.

For a full description of the invention and the merits thereof and also to acquire a knowledge of the details of construction of the means for effecting the result reference is to be had to the following description and accompanying drawings, in which—

Figure 1 is a broken view showing the wheel constructed in accordance with the invention, the hub of the wheel being shown partially in section, as well as the rim, to bring out clearly the manner of attaching the spokes thereto. Fig. 2 is a vertical sectional view showing clearly the manner of connecting the spokes and rim and means for holding the tire in position.

Corresponding and like parts are referred to in the following description and indicated in both views of the drawings by the same reference characters.

The wheel illustrated in the drawings consists of the hub 1, the spokes 2, and the channel-iron sections 3. The detail construction of the hub 1 does not form a part of this invention, and therefore will not be specifically described. Said hub, however, comprises a shell through which the inner extremities of the spokes 2 pass, said inner extremities being threaded to receive nuts 4 and 5. The nut 5 is arranged exteriorly to the shell of the hub, whereas the nut 4 of each spoke is within the shell, this construction being such as to enable the nuts to be screwed toward each other and to be clamped against opposite sides of the shell in attaching the spokes thereto. The spokes 2 preferably consist of bars of flat construction almost throughout their length, having threaded extremities, however, to facilitate attachment thereof to the rim and hub.

As above premised, the rim of the wheel consists of a channel-iron made in sections, and the tire 6 is secured to the channel-iron sections in a peculiar manner. Said tire 6 is received between annular plates 7, which plates are provided upon the inner sides thereof and near both the inner and outer peripheral portions with annular grooves 8. The grooves 8 of the plates 7 receive annular ribs 9, integrally formed with the outer side of the tire 6. The innermost of the grooves 8 receive the edge portions of a band 10, surrounding the channel-iron sections between the spaced flanges thereof. The band 10 is preferably of metal, having its edge portions reduced so as to enter the innermost grooves 8 of the plates 7. Said band serves as means for holding the inner portions of the plates rigidly separated to effectively cause the outermost portions of said plates to embrace the said tire 6 firmly upon opposite sides thereof. The outer ends of the spokes 2 being threaded are adapted to pass through the channel-iron sections 3 and the band 10, a nut 11 being threaded upon the outermost extremity of each spoke, so as to clamp the band 10 to the adjacent channel-iron section and also secure the spoke thereto. A second nut 12 is also screwed upon the outer threaded portion of the spokes 2, the last-mentioned nut screwing against the channel-iron sections exteriorly thereto, said channel-iron sections being clamped between the nuts 11 and 12, which at the same time coöperate to hold the tire 6 in position.

In assembling the several parts of the rim structure of the wheel the channel-iron parts 3 are placed in position on the spokes, the inner nuts 12 having previously been screwed until disposed at the inner limit of movement on the outer threaded portion of the several spokes. This having been done, the band 10 is placed in position on the spokes, the nuts 11 being then screwed in place. The tire 6 is now placed in a position surrounding the band 10, and the plates 7 are arranged at opposite sides of and interlocking with said tire. The nuts 12 may now be screwed toward the outer extremities of the spokes 2, carrying the same, and they will force the channel-iron parts 3 outwardly until the flanges of said parts 3 receive the band 10 and the inner portions of the plates 7 therebetween, said flanges positively holding the plates 7 interlocking with the tire and with the band 10, as shown in Fig. 2 of the drawings. The tire 6 may of course be made of rubber or any suitable material.

Having thus described the invention, what is claimed as new, and desired to be secured by Letters Patent, is—

1. In wheel structure, the combination of a hub, spokes, a rim comprising a channel-iron composed of sections having the outer ends of the spokes passed therethrough, a tire received in the channel-iron sections, and means for securing the spokes to the channel-iron sections and preventing displacement of the tire therefrom.

2. In wheel structure, the combination of a hub, spokes, a rim comprising a channel-iron composed of sections having the outer ends of the spokes passed therethrough, a tire received in the channel-iron sections, spaced plates in the channel-iron sections receiving the tire therebetween, and means for securing the spokes to the channel-iron sections and preventing displacement of the spaced plates aforesaid, said spaced plates being adapted to hold the tire from displacement.

3. In a wheel, in combination, a hub, spokes, a rim comprising a channel-iron composed of sections having the outer ends of the spokes passed therethrough, a tire mounted in the channel-iron sections, spaced annular plates upon opposite sides of the tire, a band surrounding the channel-iron sections and disposed between the plates aforesaid, and connecting means between the spokes and the band for the purpose specified.

4. In a wheel, the combination of a hub, spokes, a rim comprising a channel-iron composed of sections provided with openings receiving the outer ends of said spokes, the outer ends of the spokes being threaded, a tire received by the channel-iron sections and provided with annular ribs on the sides thereof, spaced annular plates upon opposite sides of the tire and interlocking with the ribs aforesaid, a band surrounding the tire and disposed between the inner portions of the annular plates aforesaid, said band interlocking with the plates, and nuts threaded upon the outer ends of the spokes, one of said nuts clamping the band in position and the other securing the channel-iron sections relatively thereto.

In testimony whereof I affix my signature in presence of two witnesses.

CHARLEY R. BOHANNON. [L. S.]

Witnesses:
ELSIE MASDEN,
W. M. MARSHALL.